Aug. 28, 1951     V. VLTAVSKY     2,566,101
ELECTRICALLY HEATED INJECTION CHAMBER
Filed Dec. 20, 1947
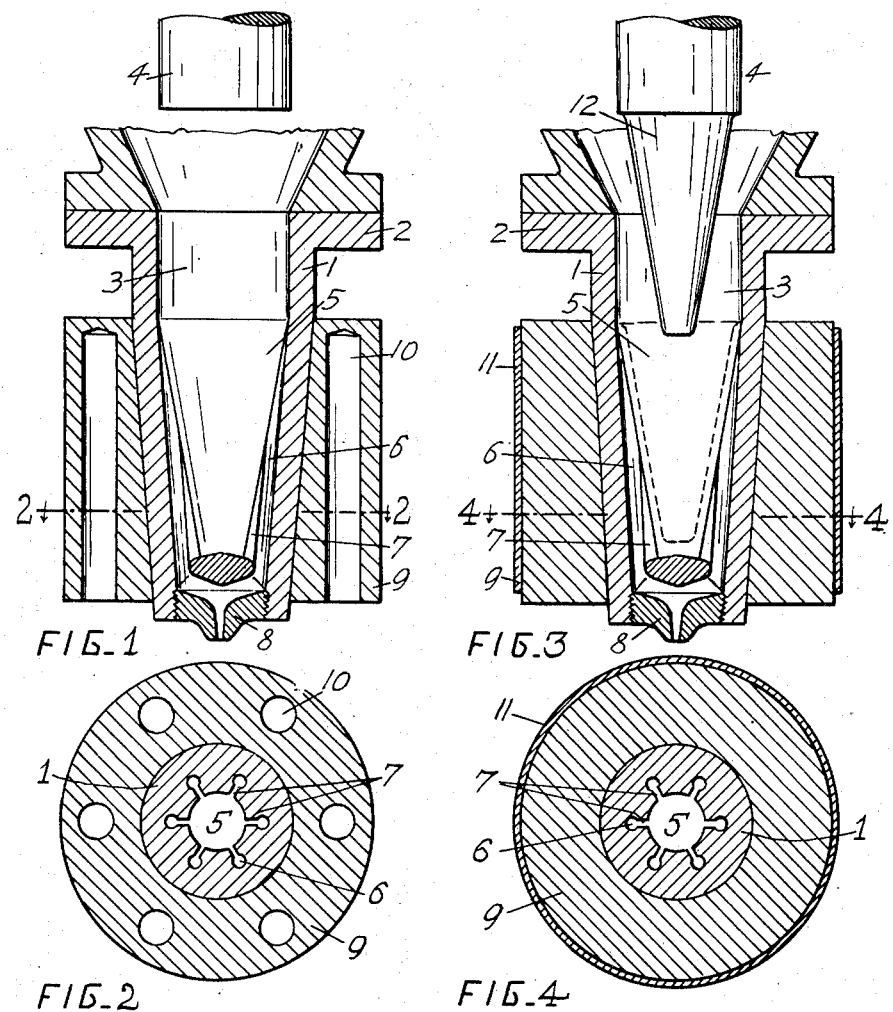
INVENTOR:
VLADIMIR VLTAVSKY Patented Aug. 28, 1951

2,566,101

UNITED STATES PATENT OFFICE 2,566,101

ELECTRICALLY HEATED INJECTION CHAMBER

Vladimír Vltavský, Prague, Czechoslovakia

Application December 20, 1947, Serial No. 793,027
In Germany January 8, 1945

Section 1, Public Law 690, August 8, 1946
Patent expires January 8, 1965

8 Claims. (Cl. 18—30)

The present invention relates to improvements in electrical heated melting chambers in injection moulding machine for thermoplastic materials.

Injection moulding machines for the treatment of thermoplastic materials, in particular for large outputs, are provided on the inner walls of their heating or melting chambers with ribs of different shapes which serve to increase the heating surface and facilitate the melting of the mass. Electrically heated melting chambers of this kind are provided on their circumference and on their surface with suitably disposed heating bodies, which supply heat to such portions where it is just needed. Melting chambers of this kind are particularly suitable for various materials which are not sensitive to over heating. The melting chamber has to be designed for considerable pressures, required for the pressing or injecting of the material which is not always uniformly melted and in numerous points remains in a relatively solid state, as no provision is known as yet by which a material which is molten in one place could be withdrawn irrespective of the condition of material in other portions. Moreover, in the known melting chambers a considerable volume of material, ready for melting, is contained, which fact may easily be a cause of decomposition of such thermoplastic substances which do not withstand a higher temperature for a longer period, as is frequently the case for instance in injection moulding of articles having a smaller volume than the size of the melting chamber.

It has already been suggested to remove such drawbacks by employing steam or hot water heating in which case overheated portions are avoided. Instead, however, there are grave difficulties in particular when working with higher temperatures e. g. above 200° C. in consequence of the high presures required in such cases.

The present invention relates to a melting chamber for electrically heated injection moulding machines for thermoplastic substances which is free from the said drawbacks.

The main feature of the electrically heated melting chamber according to the invention resides therein that in addition to the pressure space, adapted to receive the pressure piston, said melting chamber has a frusto-conically tapered storage space, the walls of which are provided with a series of bores, arranged substantially along generatrices of the cylinder or cone and have a smaller angle of apex than the storage space, the wall between the said bores and the storage space being interrupted by narrow slots permitting the withdrawal of the molten mass, said melting chamber being further provided on its circumference with a heating body made from a material of good heat conductivity.

In order that the invention may be clearly understood and readily carried into effect, reference will now be made to the accompanying drawing in which one example of the melting chamber according to the invention is shown.

In the drawing:

Fig. 1 is a vertical section of the melting chamber unit of an injection moulding machine made according to the invention and embodying the same in a practical form;

Fig. 2 is a transverse section of the melting chamber unit of Figure 1, as taken on line 2—2;

Fig. 3 is a vertical section illustrating the modification of the structure of Figure 1; and Fig. 4 is a transverse section of the melting chamber unit of Figure 3, taken on line 4—4.

In the mentioned views, the various reference numerals are so applied that the same numerals apply to the same or like parts and features throughout.

With reference to the drawings the melting chamber 1 is provided on its upper end with a flange 2 by means of which it is secured to the frame of the machine. As shown in Fig. 1 the melting chamber is provided with a cylindrical pressure space 3 adapted to receive the piston 4 from above the melting chamber during the injection operation. The pressure space extends at its lower end into a tapered space 5 of frusto-conical shape. Along the circumference of this space a series of bores, elongated passages or channels 6 is arranged, said channels being bored substantially along the generatrices of the cone but with a smaller angle of apex than the inner space 5 or alternatively, in connection with small melting chambers, along the generatrices of the cylinder. The remaining metal between the bores 6 and the interior space 5 of the melting chamber is interrupted by narrow slots 7, as best seen in Figure 2. The bores 6 are connected at their lower end with an injection nozzle 8 said nozzle being preferably screwed in into the melting chamber.

The melting chamber 1 is made of a metal of considerable strength such as steel and its wall have a thickness corresponding just to the highest stress to which the chamber is subjected, in order to allow a quick transmission of heat. The source of heat is a ring 9 rigidly secured or preferably cast on to the outside of the melting chamber, said ring 9 consisting of a good conductor of heat such as aluminium. Suitable recesses 10 are arranged for the insertion of heating rods or the like heating bodies preferably electrically heated. If desired, the ring may be provided on the outside in the form of a closely fitted heating strip 11.

The heat from the electric heating bodies is received at first by the ring 9 which has a better heat conductivity than the chamber 1 and, therefore, transmits the heat uniformly to the coolest portions. If a material is treated, the softening point and the injection temperature of which differ considerably from each other, heat is consumed in a relatively uniform way throughout the entire length of the melting chamber. On the contrary, in connection with a material which melts suddenly without first passing through a softening stage, the transmission or passage of heat is greatest in the upper part of the melting chamber where its circumference is largest. The piston 4 withdraws heat from the ring 9 in a considerable extent even in upwards direction from the lower portions and prevents thus the material from being overheated in the lower portions of the chamber.

When treating material which does not withstand being kept on a higher temperature for a longer time, the injection piston 4 may be provided as shown in Figure 3, with a conical extension 12, which fills the greatest part of the conical space 5 so that the melting chamber contains in operation just the indispensable quantity of material.

The device described above operates as follows:

The thermoplastic material is brought into the cylindrical pressure space 3, wherein it is compressed by the piston 4 and expelled into the conical space 5. Having been brought into contact with the hot walls of the heated cylinder the material is becoming soft or even melts. The material plasticised in this way is pressed into channels 6 in which it is completely melted whereafter it may easily pass to the nozzle 8. In addition to this, the material melts along the entire inner wall of the space 5 and flows into the lower portions through slots 7 and also into channels 6. The slots 7, extending downwards, exert increasing resistance to the flow of the material, and the flow through the channels or bores 6 is thus easier.

The heating operation, which in the hitherto known devices is difficult may in the device according to the invention be carried out by means of a usual electric heating, as the material during its passage through the melting chamber has to overcome only a small resistance. In carrying out the invention in practice it has been found that with the new melting chamber a pressure on the piston of 350–400 kg./cm.$^2$ for a nozzle pressure of 200 kg./cm.$^2$ is sufficient whereas in the hitherto known melting chamber a pressure of 1000–1500 kg./cm.$^2$ on the piston is necessary.

While I have disclosed the principles of my invention in connection with one embodiment it will be understood that this embodiment is given by way of example only and not as limiting the scope of the invention as set forth in the appended claims.

Having now fully described my invention, I claim:

1. In an apparatus for treating thermoplastic material, the combination of a melting chamber unit including a hollow externally substantially cylindrical member having an open inlet end for receiving the plastic material and an opposite end, the internal walls of said cylindrical member forming a hollow interior thereof into a substantially frusto-conical heating chamber having the larger end directed toward said inlet end and in open communication therewith and the opposite smaller end substantially closed; means for feeding said thermoplastic material into the frusto-conical heating chamber in the cylindrical member through the open inlet end thereof, said internal walls of said cylindrical member having a plurality of elongated internal passages arranged in a group peripherally surrounding the frusto-conical heating chamber and extending longitudinally of the latter and being in open communication therewith along at least the major portion of their length; nozzle means disposed on said opposite end of said cylindrical member and communicating with the ends of said internal passages at said opposite end of said member and adjacent to the smaller end of said frusto-conical heating chamber, said internal passages at the ends thereof which communicate with said nozzle means forming plural means of communication between the latter and said frusto-conical heating chamber; and heating means encircling said cylindrical member adjacent to said conical heating chamber whereby to promote movement of molten thermoplastic material from the latter chamber into said internal passages and thence out through said nozzle means.

2. In an apparatus for treating thermoplastic material, the combination of a melting chamber unit including a hollow externally substantially cylindrical member having an open inlet end for receiving the plastic material and an opposite end, the internal walls of said cylindrical member forming a hollow interior thereof into a substantially frusto-conical heating chamber having the larger end directed toward said inlet end and in open communication therewith and the opposite smaller end substantially closed; means for feeding said thermoplastic material into the frusto-conical heating chamber in the cylindrical member through the open inlet end thereof, said internal walls of said cylindrical member having a plurality of elongated internal passages arranged in a group peripherally surrounding the frusto-conical heating chamber and extending longitudinally of the latter and being in open communication therewith radially throughout at least the major portion of their length; nozzle means disposed on said opposite end of said cylindrical member and communicating with the ends of said internal passages at said opposite end of said member and adjacent to the smaller end of said frusto-conical heating chamber, said internal passages at the ends thereof which communicate with said nozzle means forming the exclusive means of communication between the latter and said frusto-conical heating chamber; and heating means encircling said cylindrical member adjacent to said conical heating chamber whereby to promote movement of molten thermoplastic material from the latter chamber into said internal passages and thence out through said nozzle means.

3. In an apparatus for treating thermoplastic material, the combination of a melting chamber unit including a hollow externally substantially cylindrical member having an open inlet end for receiving the plastic material and an opposite end, the internal walls of said cylindrical member forming a hollow interior thereof into a substantially frusto-conical heating chamber having the larger end directed toward said inlet end and in open communication therewith and the opposite smaller end substantially closed; means for feeding said thermoplastic material into the frusto-conical heating chamber in the cylindrical member through the open inlet end thereof, said internal walls of said cylindrical member having a plurality of elongated internal bores arranged in a group peripherally surrounding the frusto-conical heating chamber and extending longitudinally of the later and being in open communication therewith along at least the major portion of their length; nozzle means disposed on said opposite end of said cylindrical member and communicating with the ends of said internal bores at said opposite end of said member and adjacent to the smaller end of said frusto-conical heating chamber, said internal bores at the ends thereof which communicate with said nozzle means forming plural means of communication between the latter and said frusto-conical heating chamber; and heating means encircling said cylindrical member adjacent to said conical heating chamber whereby to promote movement of molten thermoplastic material from the latter chamber into said internal bores and thence out through said nozzle means.

4. In an apparatus for treating thermoplastic material, the combination of a melting chamber unit including a hollow externally substantially cylindrical member having an open inlet end for receiving the plastic material and an opposite end, the internal walls of said cylindrical member forming a hollow interior thereof into a substantially frusto-conical heating chamber having the larger end directed toward said inlet end and in open communication therewith and the opposite smaller end substantially closed; means for feeding said thermoplastic material into the frusto-conical heating chamber in the cylindrical member through the open inlet end thereof, said internal walls of said cylindrical member having a plurality of elongated internal passages arranged in a group peripherally surrounding the frusto-conical heating chamber and extending longitudinally of the latter along the generatrices of a cone having a smaller vertex angle than that of said frusto-conical heating chamber and being in open communication therewith radially throughout at least the major portion of their length; nozzle means disposed on said opposite end of said cylindrical member and communicating with the ends of said internal passages at said opposite end of said member and adjacent to the smaller end of said frusto-conical heating chamber, said internal passages at the ends thereof which communicate with said nozzle means forming the exclusive means of communication between the latter and said frusto-conical heating chamber; and heating means encircling said cylindrical member adjacent to said conical heating chamber whereby to promote movement of molten thermoplastic material from the latter chamber into said internal passages and then out through said nozzle means.

5. In an apparatus for treating thermoplastic material, the combination of a melting chamber unit including a hollow externally substantially cylindrical member having an open inlet end for receiving the plastic material and an opposite end, the internal walls of said cylindrical member forming a hollow interior thereof into a substantially frusto-conical heating chamber having the larger end directed toward said inlet end and in open communication therewith and the opposite smaller end substantially closed; means for feeding said thermoplastic material into the frusto-conical heating chamber in the cylindrical member through the open inlet end thereof, said internal walls of said cylindrical member having a plurality of elongated internal passages arranged in a group peripherally surrounding the frusto-conical heating chamber and extending longitudinally of the latter along the generatrices of a cylinder and being in direct open communication with said frusto-conical heating chamber radially throughout at least the major portion of their length; nozzle means disposed on said opposite end of said cylindrical member and communicating with the ends of said internal passages at said opposite end of said member and adjacent to the smaller end of said frusto-conical heating chamber, said internal passages at the ends thereof which communicate with said nozzle means forming the exclusive means of communication between the latter and said frusto-conical heating chamber; and heating means encircling said cylindrical member adjacent to said conical heating chamber whereby to promote movement of molten thermoplastic material from the latter chamber into said internal passages and thence out through said nozzle means.

6. In an apparatus for treating thermoplastic material, the combination of a melting chamber unit including a hollow externally substantially cylindrical member having an open inlet end for receiving the plastic material and an opposite end, the internal walls of said cylindrical member forming a hollow interior thereof into a substantially frusto-conical heating chamber having the larger end directed toward said inlet end and in open communication therewith and the opposite smaller end substantially closed; means for feeding said thermoplastic material into the frusto-conical heating chamber in the cylindrical member through the open inlet end thereof, said internal walls of said cylindrical member having a plurality of elongated internal passages arranged in a group peripherally surrounding the frusto-conical heating chamber and extending longitudinally of the latter, said walls internally also having a plurality of longitudinally disposed radial slots directly interconnecting said internal passages and said frusto-conical heating chamber, and being in open communication therewith radially throughout at least the major portion of their length; nozzle means disposed on said opposite end of said cylindrical member and communicating with the ends of said internal passages at said opposite end of said member and adjacent to the smaller end of said frusto-conical heating chamber, said internal passages at the ends thereof which communicate with said nozzle means forming the exclusive means of communication between the latter and said frusto-conical heating chamber; and heating means encircling said cylindrical member adjacent to said conical heating chamber whereby to promote movement of molten thermoplastic material from the latter chamber into said internal passages and thence out through said nozzle means.

7. In an apparatus for treating thermoplastic material, the combination of a melting chamber unit including a hollow externally substantially cylindrical member having an open inlet end for receiving the plastic material and an opposite end, the internal walls of said cylindrical member forming a hollow interior thereof into a substantially frusto-conical heating chamber having the larger end directed toward said inlet end and in open communication therewith and the opposite smaller end substantially closed; means for feeding said thermoplastic material into the frusto-conical heating chamber in the cylindrical member through the open inlet end thereof, said internal walls of said cylindrical member having a plurality of elongated internal passages arranged in a group peripherally surrounding the frusto-conical heating chamber and extending longitudinally of the latter along the generatrices of a cylinder, said walls internally also having a plurality of longitudinally disposed radial slots of relatively smaller cross section than the cross section of said internal passages interconnecting the latter passages and said frusto-conical heating chamber along substantially the entire length of said slots; nozzle means disposed on said opposite end of said cylindrical member and communicating with the ends of said internal passages at said opposite end of said member and adjacent to the smaller end of said frusto-conical heating chamber, said internal passages at the ends thereof which communicate with said nozzle means forming plural means of communication between the latter and said frusto-conical heating chamber; and heating means encircling said cylindrical member adjacent to said conical heating chamber whereby to promote movement of molten thermoplastic material from the latter chamber into said internal passages and thence out through said nozzle means.

8. In an apparatus for treating thermoplastic material, the combination of a melting chamber unit including a hollow externally substantially cylindrical member having an open inlet end for receiving the plastic material and an opposite end, the internal walls of said cylindrical member forming a hollow interior thereof into a substantially frusto-conical heating chamber having the larger end directed toward said inlet end and in open communication therewith and the opposite smaller end substantially closed; said internal walls of said cylindrical member having a plurality of elongated internal passages arranged in a group peripherally surrounding the frusto-conical heating chamber and extending longitudinally of the latter and being in open communication therewith radially throughout at least the major portion of their length; nozzle means disposed on said opposite end of said cylindrical member and communicating with the ends of said internal passages at said opposite end of said member and adjacent to the smaller end of said frusto-conical heating chamber, said internal passages at the ends thereof which communicate with said nozzle means forming the exclusive means of communication between the latter and said frusto-conical heating chamber; means for feeding thermoplastic material into said frusto-conical heating chamber comprising a plunger movable into said chamber through the open inlet end thereof; a rigid tapered extremity upon the end of the plunger spaced within the internal walls of said frusto-conical heating chamber when the plunger extends into the latter; and a heating body of material of a high degree of heat conductivity encircling said cylindrical member adjacent to said conical heating chamber whereby to promote movement of molten thermoplastic material from the latter chamber into said internal passages and thence out through said nozzle means.

VLADIMÍR VLTAVSKÝ.

REFERENCES CITED

The following references are of record in the file of this patent:

UNITED STATES PATENTS

| Number | Name | Date |
|---|---|---|
| 2,057,945 | Gastrow | Oct. 20, 1936 |
| 2,206,098 | Lester | July 2, 1940 |
| 2,309,496 | Bird et al. | Jan. 26, 1943 |